US00RE47752E

(19) United States
(12) Reissued Patent
Hughes

(10) Patent Number: US RE47,752 E
(45) **Date of Reissued Patent: *Dec. 3, 2019**

(54) CLOSET FLANGE SYSTEM FOR EXISTING INSTALLATION

(71) Applicant: OATEY CO., Cleveland, OH (US)

(72) Inventor: Alan Hughes, Wayne, NJ (US)

(73) Assignee: OATEY CO., Cleveland, OH (US)

( * ) Notice: This patent is subject to a terminal disclaimer.

(21) Appl. No.: 14/510,620

(22) Filed: Oct. 9, 2014

Related U.S. Patent Documents

Reissue of:
(64) Patent No.: 8,281,421
Issued: Oct. 9, 2012
Appl. No.: 13/325,343
Filed: Dec. 14, 2011

U.S. Applications:
(63) Continuation of application No. 12/442,127, filed as application No. PCT/US2007/020392 on Sep. 20, 2007, now Pat. No. 8,099,801.

(60) Provisional application No. 60/845,851, filed on Sep. 20, 2006.

(51) Int. Cl.
*E03D 11/16* (2006.01)

(52) U.S. Cl.
CPC ..... *E03D 11/16* (2013.01); *Y10T 29/49826* (2015.01)

(58) Field of Classification Search
CPC ..... E03D 11/16; E03D 11/17
USPC ..... 4/252.1, 252.4, 252.5, 252.6; 285/56, 58
See application file for complete search history.

(56) References Cited

U.S. PATENT DOCUMENTS

| | | | | |
|---|---|---|---|---|
| D29,291 | S | 8/1898 | Rice | |
| D34,101 | S | 2/1901 | Griffiths | |
| 812,543 | A | 2/1906 | Buchanan, Jr. | |
| 858,865 | A | 7/1907 | Forster et al. | |
| 870,085 | A | 11/1907 | Cosgrove | |
| 1,061,632 | A * | 5/1913 | Podolsky | 285/58 |
| 1,333,368 | A * | 3/1920 | Auer | E03D 11/16 285/363 |
| 1,648,665 | A | 11/1927 | Swanson et al. | |
| 2,479,837 | A * | 8/1949 | Hollaender | 285/60 |
| 2,673,985 | A | 4/1954 | Gay | |

(Continued)

OTHER PUBLICATIONS

Flier for J-tec Products Company, "Closet Flange Extension", undated, 1 page.

(Continued)

*Primary Examiner* — Russell D Stormer

(57) ABSTRACT

A system is provided herein which includes a closet flange insert and at least one spacer to be positioned between the closet flange insert and an installed closet flange. The closet flange insert includes a toilet connecting flange which extends radially outwardly from a through pipe. The through pipe is sized to be inserted into a pipe section of a closet flange. Each spacer includes spaced apart first and second faces, and spaced apart inner and outer edges extending between the first and second faces. The inner edge defines an opening extending through the body, the opening sized to permit passage therethrough of the through pipe of the closet flange insert but not the toilet connecting flange of the closet flange insert. With the subject invention, a system is provided which allows the closet flange insert to be mounted atop an installed closet flange flush with surrounding finished flooring.

7 Claims, 4 Drawing Sheets

(56) References Cited

U.S. PATENT DOCUMENTS

| | | | | |
|---|---|---|---|---|
| 2,750,216 | A * | 6/1956 | Thies | 4/252.6 |
| 2,908,513 | A | 10/1959 | Karlinski | |
| 3,012,252 | A * | 12/1961 | Roy Gaddy | 4/252.5 |
| 3,311,391 | A * | 3/1967 | Harrell | 285/58 |
| 3,501,172 | A | 3/1970 | Pickard | |
| 3,846,851 | A | 11/1974 | Pepper | |
| 3,896,510 | A | 7/1975 | O'Connell | |
| 3,967,326 | A | 7/1976 | Tammen | |
| 4,090,267 | A | 5/1978 | Cuschera | |
| 4,207,630 | A | 6/1980 | Bressler | |
| 4,233,697 | A | 11/1980 | Cornwall | |
| 4,384,910 | A | 5/1983 | Prodyma | |
| 4,406,480 | A | 9/1983 | Izzi | |
| 4,482,161 | A | 11/1984 | Izzi, Sr. | |
| 4,502,166 | A | 3/1985 | Brown, Sr. | |
| 4,515,398 | A | 5/1985 | Machon, Sr. | |
| 4,562,602 | A | 1/1986 | Cuschera | |
| 4,827,539 | A | 5/1989 | Kiziah | |
| 4,984,308 | A | 1/1991 | Handal | |
| 5,018,224 | A | 5/1991 | Hodges | 4/252.6 |
| 5,115,554 | A | 5/1992 | Fell, Sr. | |
| 5,185,890 | A | 2/1993 | Dismore et al. | |
| D334,051 | S | 3/1993 | Fell, Sr. | |
| 5,190,320 | A | 3/1993 | Hodges | |
| 5,232,250 | A | 8/1993 | Bonacci | |
| 5,297,817 | A | 3/1994 | Hodges | |
| 5,377,361 | A | 1/1995 | Piskula | |
| 5,421,036 | A | 6/1995 | Stevens et al. | |
| 5,432,957 | A | 7/1995 | Fernie et al. | |
| 5,492,372 | A | 2/1996 | Dranberg | |
| 5,937,450 | A | 8/1999 | Jones | |
| 5,996,134 | A | 12/1999 | Senninger | |
| 6,065,160 | A | 5/2000 | Winn | |
| 6,070,910 | A | 6/2000 | Hodges | |
| 6,085,362 | A | 7/2000 | Huber | |
| 6,128,947 | A | 10/2000 | Anderson, Sr. | |
| 6,223,356 | B1 | 5/2001 | Corbin | |
| 6,332,632 | B1 | 12/2001 | Hodges | |
| 6,381,775 | B1 | 5/2002 | Sondrup | |
| 6,443,495 | B1 | 9/2002 | Harmeling | |
| 6,519,784 | B2 | 2/2003 | Carwile | |
| 6,581,214 | B1 | 6/2003 | Love et al. | |
| 6,598,241 | B1 | 7/2003 | Williams | |
| 6,691,331 | B2 * | 2/2004 | Gallacher et al. | 4/252.5 |
| 6,745,408 | B2 | 6/2004 | Spells, Sr. | |
| 6,751,812 | B2 | 6/2004 | Malloy | |
| 7,069,603 | B2 | 7/2006 | Flushing | |
| D574,931 | S | 8/2008 | Hughes | |
| 7,805,777 | B2 | 10/2010 | Hughes | |
| 8,099,801 | B2 | 1/2012 | Hughes | |
| 2001/0045710 | A1 * | 11/2001 | Nguyen et al. | 277/604 |
| 2004/0034907 | A1 | 2/2004 | Malloy | |
| 2005/0050623 | A1 | 3/2005 | Greene | |
| 2005/0060795 | A1 | 3/2005 | Long et al. | |
| 2005/0278841 | A1 | 12/2005 | Coronado et al. | |
| 2006/0213003 | A1 | 9/2006 | Hughes | |
| 2008/0148469 | A1 | 6/2008 | Dipzinski et al. | |
| 2010/0123307 | A1 | 5/2010 | Coronado | |

OTHER PUBLICATIONS

Web page, http://jtecprod.com/products2.html, untitled document, dated Mar. 12, 2005, 1 page.

Quik-Fix, "closet ring extenders, flange support kit, metal ring replacement flange, Quik Fix, Span-A-B . . . " http://www.quickfixplumbingproducts.com/, dated Mar. 23, 2005, 3 pages.

Quik-Fix, "closet flange extender brochure", http://www.quickfixplumbingproducts.com/extbroch.htm, dated Mar. 23, 2005, 1 page.

Web page, http://www.bluechipdistributor.com/catalog/i203.html, "New! Sioux Chief Stainless Steel Push-Tile Gasketed Toilet Flange", Mar. 23, 2005, 1 page.

Web page, http://www.wantasub.com/bayflange.html, "Toilet Flange", Mar. 23, 2005, 1 page.

* cited by examiner

CLOSET FLANGE SYSTEM FOR EXISTING INSTALLATION

Matter enclosed in heavy brackets [ ] appears in the original patent but forms no part of this reissue specification; matter printed in italics indicates the additions made by reissue; a claim printed with strikethrough indicates that the claim was canceled, disclaimed, or held invalid by a prior post-patent action or proceeding.

CROSS-REFERENCES TO RELATED APPLICATIONS

This application is a continuation of U.S. application Ser. No. 12/442,127, filed Mar. 20, 2009, now U.S. Pat. No. 8,099,801, which is a National Stage Application under 35 U.S.C. §371 of PCT Application No. PCT/US2007/020392, filed Sep. 20, 2007, which claims priority of U.S. Provisional Application No. 60/845,851, filed Sep. 20, 2006, the entire contents of which are hereby incorporated by reference.

BACKGROUND OF THE INVENTION

With new building construction or renovation, a closet flange is typically installed prior to installation of finished flooring. To do so, a hole is made through the sub-flooring at a desired location for a toilet. The hole is sized to accommodate a closet flange. There are, then, several options in the prior art to install a closet flange through the hole in the sub-flooring. In one option, a closet flange is directly fastened to the sub-flooring, and a finished flooring is installed about the closet flange. With the closet flange fixed to the sub-flooring, however, the finished flooring extends above the closet flange, thus not permitting a direct connection between a toilet and the closet flange. To allow for a proper sealed connection, closet flange extenders have been developed in the prior art to increase the height of the closet flange to that of the finished flooring, such as described in U.S. Pat. No. 4,384,910 to Prodyma, and U.S. Pat. No. 5,018,224 to Hodges. As can be appreciated by those skilled in the art, the closet flange extenders are in contact with any fluid flow from the toilet bowl and provide undesired additional leakage points.

To avoid closet flange extenders, closet flanges have been installed with spacers to elevate the closet flanges above the sub-flooring. Typically, materials available at a building site have been used as the spacers to elevate a closet flange. For example, pieces of copper tubing or wood have been wedged between a closet flange and a sub-flooring to elevate the closet flange. Ideally, the spacers allow finished flooring to be installed flush below the closet flange, thereby allowing a toilet to rest on the finished flooring and be directly connected to the closet flange without any closet flange extenders. However, the scrap material spacers often either do not provide sufficient elevation to accommodate the thickness of the finished flooring, thus not permitting a finished flooring to fit between the closet flange and the sub-flooring, or provide an elevation greater than the thickness of the finished flooring, thereby elevating the closet flange more than desired (the toilet may not rest flush on the finished flooring). In either scenario, undesired adjustment of the closet flange height is required.

The problem of coordinating a finished closet flange height and finished flooring has been recognized in the prior art and several solutions have been proposed. For example, U.S. Pat. No. 6,065,160 to Winn proposes a threaded closet flange which may have its height adjusted by rotation. U.S. Pat. No. 6,751,812 to Malloy proposes a closet flange having a thickened flange portion which coincides with the thickness of a finished floor. The Malloy closet flange is a unitary piece. U.S. Pat. No. 6,443,495 to Harmeling proposes a closet flange having elevation structures located thereabout to provide spacing between the sub-flooring and the closet flange. As with the Malloy closet flange, the Harmeling closet flange is also a unitary structure. U.S. Pat. No. 5,996,134 to Senninger proposes the use of a spacer equivalent to the height of a poured concrete sub-flooring to raise the closet flange above the sub-flooring.

U.S. Pat. No. 6,581,214 to Love et al. discloses a spacer and shim assembly for raising a closet flange. Stackable spacers of equal thickness are provided. The spacers are stacked to achieve a required thickness and are provided with detents to prevent rotation therebetween. Once stacked, the spacers have tabs which are fastened to a sub-flooring, and a closet flange is fixed to the spacers, not to the sub-flooring.

U.S. patent application Ser. No. 11/269,022, filed Nov. 8, 2005 and PCT International Application No. PCT/US2006/10669, filed Mar. 23, 2006, disclose closet flange spacers for supporting a closet flange above a sub-flooring. The disclosed spacers are well-suited for new installations, where a closet flange has yet to be installed. However, in existing installations where closet flanges are already installed, such as in renovations, the closet flange would have to be detached from the sub-flooring and a closet flange reinstalled to be used with the disclosed closet flange spacers. It is desired to provide a toilet connection flush with a finished flooring to avoid not only prior art closet flange extenders, but also disassembly of an installed closet flange.

SUMMARY OF THE INVENTION

A system is provided herein which includes a closet flange insert and at least one spacer to be positioned between the closet flange insert and an installed closet flange. The closet flange insert includes a toilet connecting flange which extends radially outwardly from a through pipe. The through pipe is sized to be inserted into a pipe section of a closet flange. Each spacer includes spaced apart first and second faces, and spaced apart inner and outer edges extending between the first and second faces. The inner edge defines an opening extending through the body, the opening sized to permit passage therethrough of the through pipe of the closet flange insert but not the toilet connecting flange of the closet flange insert. Advantageously, with the subject invention, a system is provided which allows the closet flange insert to be mounted atop an installed closet flange, with one or more spacers therebetween, and with the closet flange insert being flush with surrounding finished flooring.

DETAILED DESCRIPTION OF THE INVENTION

A system is provided herein which includes a closet flange insert 10 and at least one spacer 12. The spacer(s) 12 are formed in accordance with the disclosure of U.S. patent application Ser. No. 11/269,022, published as U.S. Published Patent Application No. 2006/0213003 A1, and PCT International Application No. PCT/US2006/10669, published as PCT Published Patent Application No. WO 2006/104861. The disclosures of these references are incorporated by reference herein.

Figure 5:
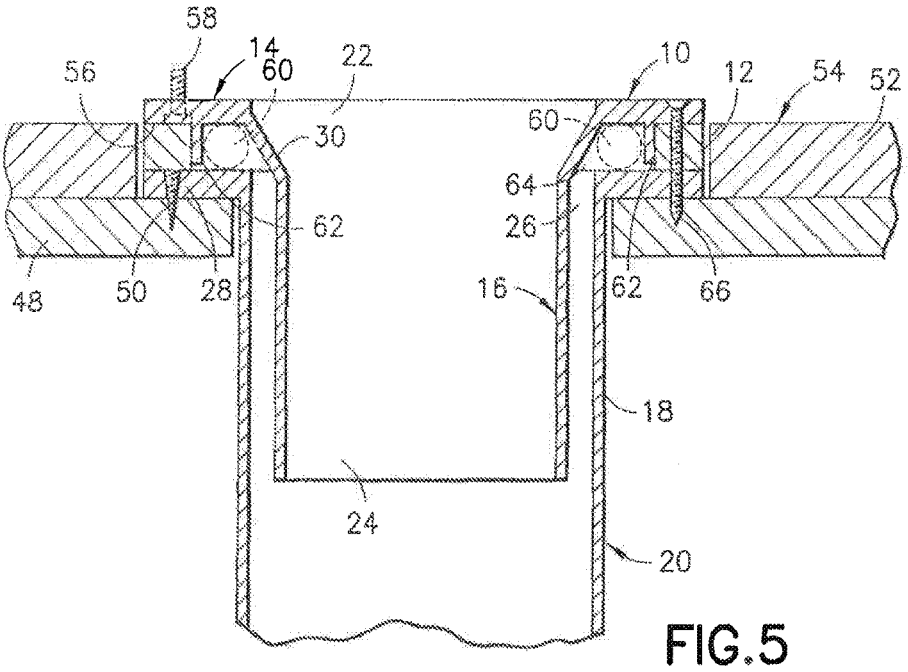
FIG. 5 is a schematic cross-section of an installed closet flange spacer system in accordance with the subject invention.

The closet flange insert 10 includes an annular flange 14 extending from a through pipe 16. The through pipe 16 is formed with an outer diameter sized to fit within, and telescope into, a pipe section 18 of a closet flange 20 (FIG. 5). Standard closet flanges typically come in 3 inch or 4 inch diameters. The subject invention may be sized to these standard sizes or to other sizes. The through pipe 16 extends between an inlet opening 22, formed in the flange 14 and at least partially circumscribed thereby, and an outlet opening 24. The inlet opening 22 is preferably sized to generally the diameter of an inlet opening 26 of the closet flange 20. Likewise, the annular flange 14 is preferably sized generally the same as an annular flange 28 of the closet flange 20 so as to act as a toilet connecting flange. Preferably, the annular flange 14 is configured to at least partially overlie the annular flange 28 of the closet flange 20 with the closet flange insert 10 in use. In this manner, the closet flange insert 10, particularly at the annular flange 14, may be connected to a toilet in the same manner as the closet flange 20. It is desired to have the annular flange 14 sized to not pass through the inlet opening 26.

With reference to FIG. 5, the outlet opening 24 is sized to fit within the pipe section 18 of the closet flange 20 and thus, has a smaller diameter than the inlet opening 22. To facilitate the change in diameter, a transition 30, which may be a tapered or flared section of the closet flange insert 10, such as located along the length of the through pipe 16, may be provided.

One or more fastener holes 32 may be formed in the annular flange 14. The fastener holes 32 are circumferentially spaced apart. The fastener holes 32 may be elongated slots to allow for radial adjustment of the closet flange insert 10 relative to any fastener(s) passing therethrough. The fastener holes 32 are sized to accommodate typical fastener diameters, e.g., typical screw diameters. In addition, one or more slots 34 may be provided in the flange 14 shaped to accommodate closet flange bolts.

Figure 4:
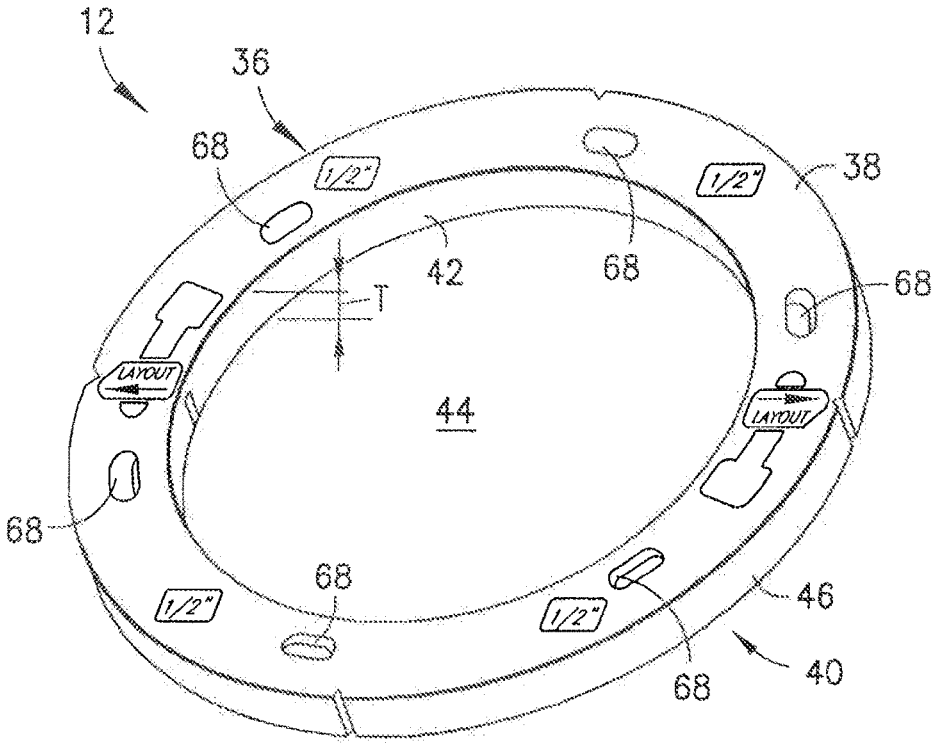
FIG. 4 is a perspective view of a spacer usable with the subject invention.

With reference to FIG. 4, one or more of the spacers 12 may be utilized. Each of the spacers 12 includes a body 36, which is preferably disc-shaped. The body 36 includes opposed first and second faces 38 and 40, which are both preferably flat. In addition, the body 36 includes an inner edge 42, defining an opening 44 through the body 36, and an outer edge 46. The opening 44 is sized to permit passage therethrough of the through pipe 16 of the closet flange insert 10 but not the flange 14. Preferably, the body 36 has an annular shape with the inner and/or outer edges 42, 46 being circular. The body 36 may be formed with a generally constant thickness T between the first and second faces 38 and 40. The thickness T may be generally 0.125 inches, 0.25 inches, 0.5 inches, or 0.75 inches.

With reference to FIG. 5, an installed closet flange spacer system prepared in accordance with the subject invention is shown. The system is used in conjunction with the closet flange 20 having been previously installed. Specifically, the closet flange 20 is fastened to sub-flooring 48 with one or more fasteners 50. With the installation of new finished flooring 52, the top surface 54 of the finished flooring 52 is above, and not flush with, the closet flange 20. To install the subject invention, prior to, during and/or after installation of the finished flooring 52, one or more of the spacers 12 is laid atop the closet flange 20. As explained in U.S. patent application Ser. No. 11/269,022 and PCT International Application No. PCT/US2006/10669, one or more of the spacers 12 (of the same or varying thicknesses) may be used to accommodate the thickness of the finished flooring 52 (e.g., two or more of the spacers 12 may be stacked). With the proper selection and placement of the spacer(s) 12 to equal or approximately the thickness of the finished flooring 52, the closet flange insert 10 is placed atop the uppermost spacer 12 with the through pipe 16 extending through the spacer(s) 12, particularly the opening(s) 44, and into the pipe section 18 of the closet flange 20. The through pipe 16 must have sufficient length to extend into the pipe section 18 when placed into use.

As shown in FIG. 5, it is preferred that the stacked arrangement of the spacer(s) 12 have generally the equal height of the finished flooring 52. In this manner, lower face 56 of the closet flange insert 10 may be generally flush with the top surface 54 of the finished flooring 52. As shown in FIG. 5, closet flange bolts 58 may be attached to the closet flange insert 10, such as to the slots 34, as is known in the art, with the closet flange bolts 58 resting on the uppermost spacer 12. With this arrangement, a toilet may rest flush on the finished flooring 52 and be directly connected to the closet flange insert 10, particularly at the flange 14, without extenders or other devices.

To prevent gases from escaping from the soil pipe through the spacing between the closet flange 20 and the closet flange insert 10, one or more seals 60 may be provided therebetween. The seals 60 may be wax rings or elastomeric elements, such as rubber rings. The seals 60 may be located anywhere between the closet flange insert 10 and the standard closet flange 20 so as to provide sufficient sealing to prevent gas venting or escaping about the closet flange insert 10.

Figure 1:
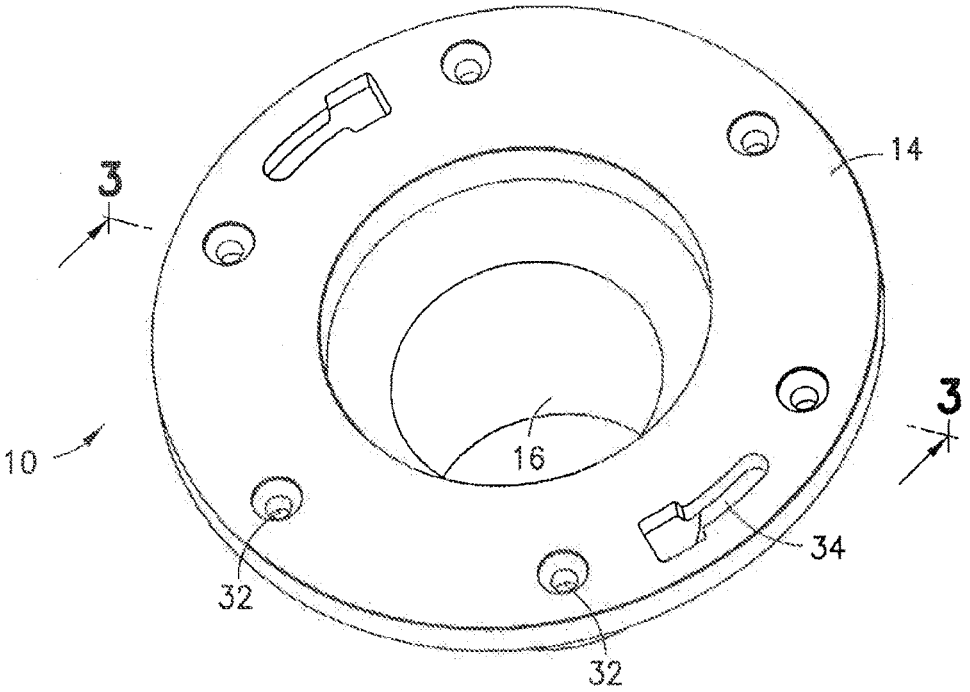
FIGS. 1 and 2 are perspective views of a closet flange insert of the subject invention.
Figure 2:
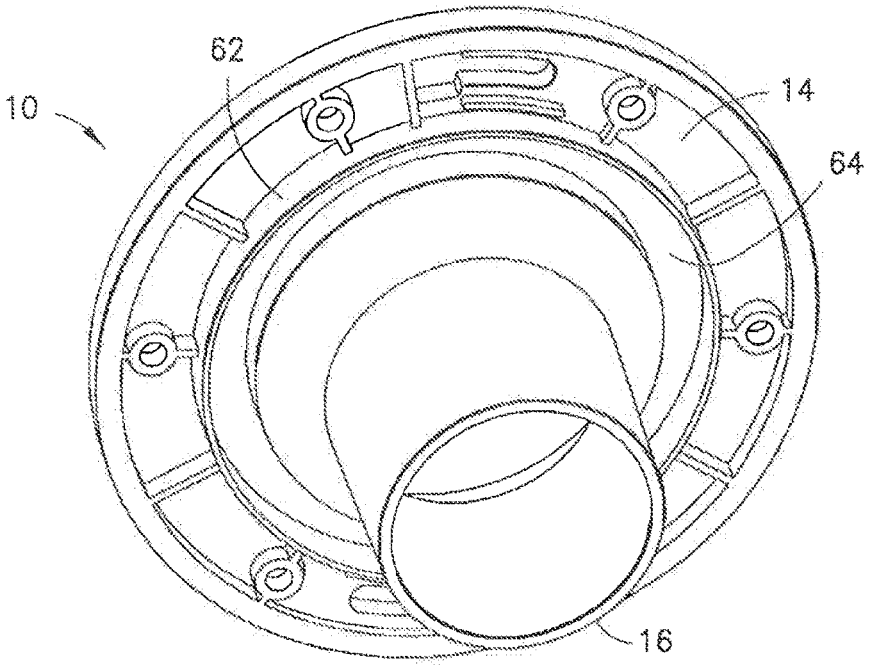
Figure 3:
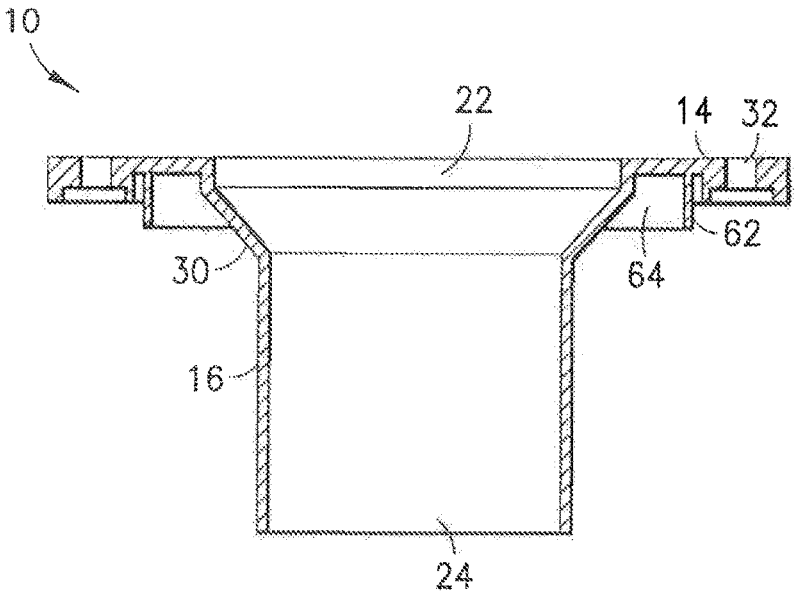
FIG. 3 is a cross-sectional view of a closet flange insert of the subject invention taken along line 3-3 of FIG. 1.

With reference to FIGS. 2 and 3, the closet flange insert 10 may be provided with a downwardly depending wall 62 extending from the flange 14. Preferably, the wall 62 is annular and continuous, although it may be discontinuous to at least partially circumscribe the through pipe 16. The wall 62 may define a diameter generally equal to the diameter of the opening(s) 44 of the spacer(s) 12 such that an outer surface of the wall 62 may be shape matingly received within the opening(s) 44. With this configuration, the wall 62 may provide a centering effect, to locate the insert 10 centrally relative to the spacer(s) 12. In addition, the wall 62 defines a channel 64 with the through pipe 16. The channel 64 may be shaped and positioned to receive one or more of the seals 60. For example, a wax seal may be inserted into the channel 64 prior to assembly of the system. It is preferred that the wall 62 be formed such that any seal accommodated in the channel 64 may have a sufficient sealing effect beyond the wall 62 and in between the closet flange insert 10 and the closet flange 20 (i.e., it is preferred that any accommodated seal extend sufficiently from the channel 64 to provide a sufficient sealing effect).

One or more fasteners 66 may be utilized to fasten the closet flange insert 10 to a surface in proximity to the closet flange 20, such as the sub-flooring 48. The fasteners 66 preferably pass through the annular flange 14, the spacer(s) 12, the closet flange 20 (particularly, the annular flange 28), and into the sub-flooring 48. Any known fasteners 66 may be used (e.g., screws, nails, rivets, etc.), and the fasteners 66 may be passed through the fastener holes 32 to limit stresses on the closet flange insert 10. The spacer(s) 12 may also be provided with fastener holes 68 (FIG. 4), as disclosed in U.S. patent application Ser. No. 11/269,022 and PCT International Application No. PCT/US2006/10669.

Figure 6:
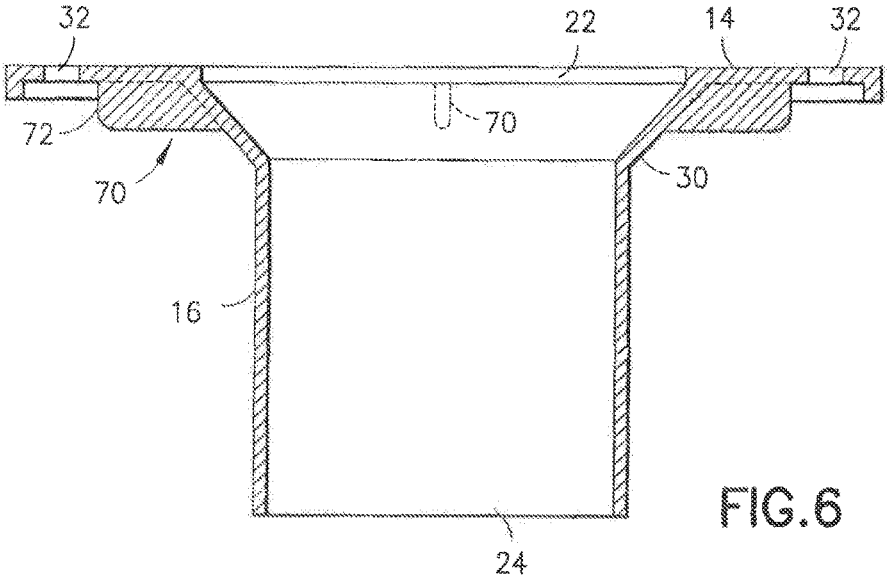
FIG. 6 is a perspective view of an alternate configuration of a closet flange insert of the subject invention; and, FIG. 7 is a schematic cross-section of an installed closet flange spacer system utilizing the closet flange insert shown in FIG. 6.
Figure 7:
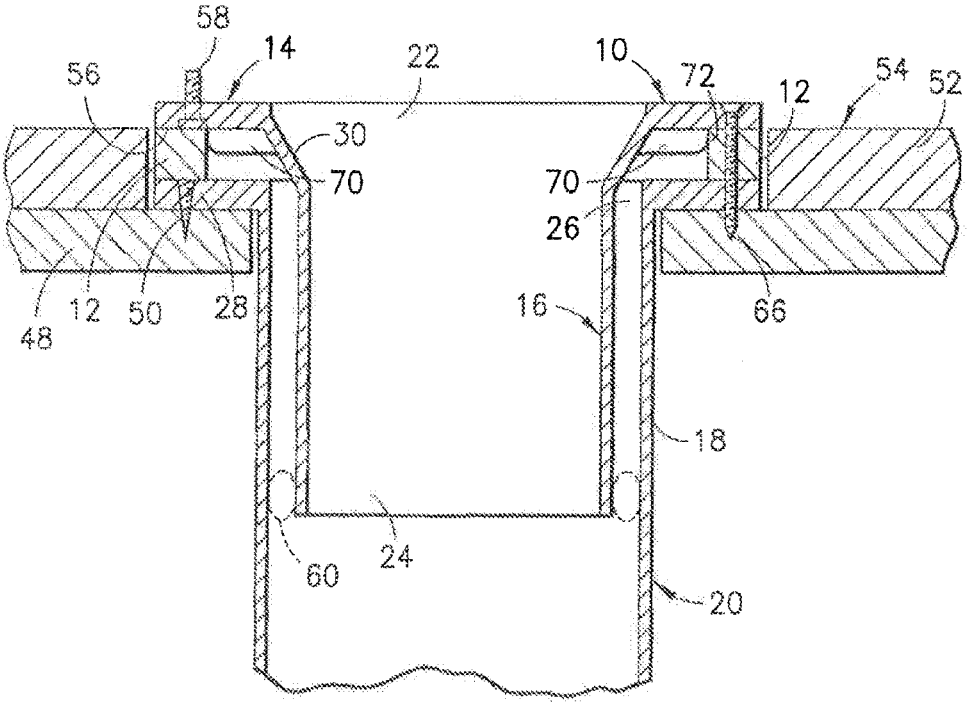

With reference to FIGS. 6 and 7, to ensure proper centering of the closet flange insert 10, and as an alternative to the wall 62, one or more ribs 70 may be provided to extend from the bottom of the annular flange 14 with end points 72 generally coinciding with the diameter of the opening(s) 44 of the spacer(s) 12. With this arrangement, the spacer(s) 12 may be evenly centered about the closet flange insert 10.

As shown in the Figures, it is preferred that the closet flange insert 10 be unitary. The insert 10 may be formed from any material, including polymeric material or metallic material (such as cast iron). The insert 10 may be formed from plastic, which is well-suited to be molded (e.g., injection molded). The insert 10 may be colored. With coloring, the insert 10 may be made visually easy to spot. Also, the insert 10 may be colored to be readily distinguishable from other building materials, particularly piping. Where standard polyvinyl chloride (PVC) piping, which is white, is being used, the insert may be colored red, and where standard acrylonitrile butadiene styrene (ABS) piping, which is black, is being used, the insert 10 may be made white and/or red.

What is claimed is:

1. A method of providing a flange for connecting to a toilet above an installed closet flange, the installed closet flange having a pipe section and an annular flange extending radially outwardly from the pipe section, said method comprising the steps of:

providing a closet flange insert having a body having a through pipe and an annular toilet connecting flange extending radially outwardly from said through pipe, said through pipe being sized to be inserted into the pipe section of the installed closet flange, said toilet connecting flange being sized to at least partially overlie the annular flange of the installed closet flange;

disposing at least one spacer atop the installed closet flange, each said spacer having a body defining an opening which permits passage therethrough of said through pipe of said closet flange insert but not said toilet connecting flange of said closet flange insert;

inserting said through pipe of said closet flange insert through said opening of each said spacer and into the pipe section of the installed closet flange; and, fastening said closet flange insert to a surface in proximity to the installed closet flange, wherein a lower face of said toilet connecting flange is generally flush with the top of finished flooring located about, and protruding above, the installed closet flange.

2. A method as in claim 1, further comprising the step of disposing at least one seal between said closet flange insert and the installed closet flange.

3. A method as in claim 1, wherein said toilet connecting flange is generally sized and shaped same as the annular flange of the installed closet flange.

*4. A combination comprising:*

*a closet flange insert for defining a flange for connecting to a toilet located above an installed closet flange, the installed closet flange having a pipe section and an annular flange extending radially outwardly from the pipe section, said closet flange insert comprising:*

*a body having a through pipe and an annular toilet connecting flange extending radially outwardly from said through pipe, said through pipe being sized to be inserted into the pipe section of the installed closet flange, said toilet connecting flange being sized to at least partially overlie the annular flange of the installed closet flange, at least one fastener hole being formed to extend through said toilet connecting flange,*

*wherein an arcuate wall depends from said toilet connecting flange to at least partially circumscribe said through pipe, said arcuate wall being spaced radially inwardly of an outer edge of said toilet connecting flange, and*

*wherein, when said through pipe is inserted into the pipe section of the installed closet flange, a lower face of said toilet connecting flange is configured to be generally flush with a top of finished flooring located about, and protruding above, the installed closet flange; and*

*at least one wax ring seated at least partially between said arcuate wall and said through pipe.*

*5. A combination as in claim 4, wherein said arcuate wall fully circumscribes said through pipe.*

*6. A method of providing a flange for connecting to a toilet above an installed closet flange, the installed closet flange having a pipe section and an annular flange extending radially outwardly from the pipe section, said method comprising the steps of:*

*providing a closet flange insert having a body having a through pipe and an annular toilet connecting flange extending radially outwardly from said through pipe, said through pipe being sized to be inserted into the pipe section of the installed closet flange, said toilet connecting flange being sized to at least partially overlie the annular flange of the installed closet flange;*

*inserting said through pipe of said closet flange insert through at least one wax ring;*

*inserting said through pipe of said closet flange insert into the pipe section of the installed closet flange; and,*

*fastening said closet flange insert to flooring with fasteners passing through said closet flange insert and into the flooring,*

*wherein, with said closet flange insert fastened to the flooring, a lower face of said toilet connecting flange is generally flush with the top of finished flooring located about, and protruding above, the installed closet flange.*

*7. A method as in claim 6, wherein said fasteners are screws.*

* * * * *